June 10, 1969  J. L. POOL ET AL  3,448,592
ANGLE DRIVE ASSEMBLY
Filed Aug. 23, 1967
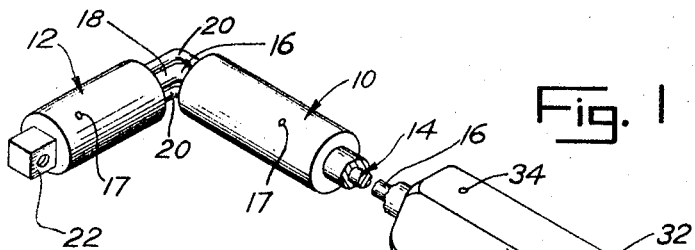
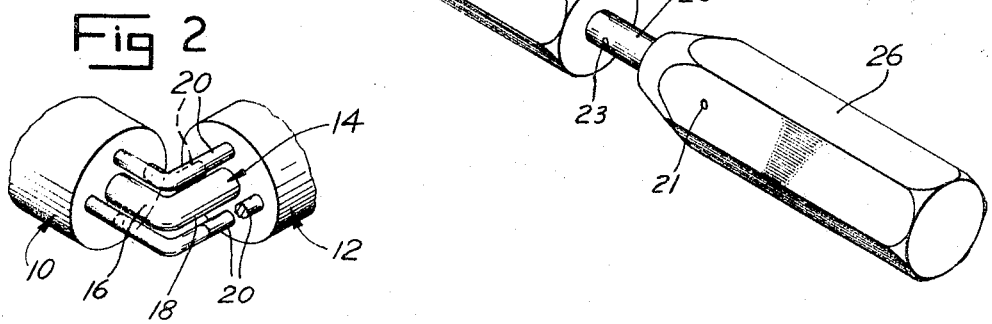
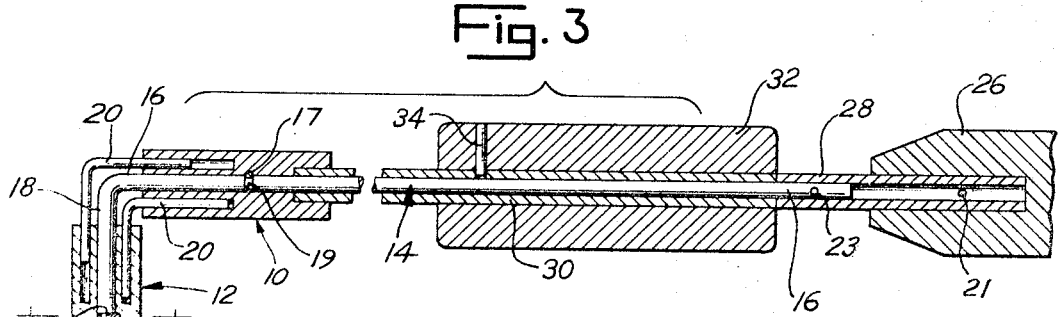
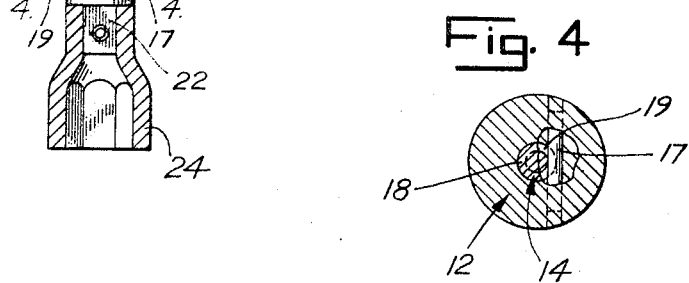
INVENTORS
JAMES L. POOL &
ALFRED L. VON TERSCH
BY Bair, Freeman &
Molinare
ATTORNEYS United States Patent Office 3,448,592
Patented June 10, 1969

3,448,592
ANGLE DRIVE ASSEMBLY
James L. Pool, Clarinda, and Alfred L. von Tersch, Villisca, Iowa, assignors to Lisle Corporation, Clarinda, Iowa, a corporation of Iowa
Filed Aug. 23, 1967, Ser. No. 662,670
Int. Cl. F16d 3/08, 3/44, 3/60
U.S. Cl. 64—20
4 Claims

ABSTRACT OF THE DISCLOSURE

An angle drive assembly of the type having a driven head rotated by rotation of a driving head through rotation-imparting angle rods. A stabilizer rod is provided on which the heads are rotatable and is provided with a handle whereby the angle drive assembly may be stabilized with respect to a bolt, nut or the like being rotated by the angle drive assembly. For convenience in rotating the assembly, a rotation-imparting sleeve and handle are also provided whereby the stabilizer handle can be held in one hand (thus conveniently holding the assembly in operating position) while the operator with his other hand may rotate the assembly.

---

One object of the invention is to provide a stabilizing means for an angle drive wherein a stabilizer rod has a shank portion and an angle portion on which a driving head and a driven head are respectively rotatable, and a handle for holding the stabilizer rod and thereby the entire angle drive assembly in proper relation to the work with which the angle drive assembly is associated.

Another object is to provide an operating handle for the angle drive assembly which is rotatable on the stabilizer rod and is located adjacent the stabilizer handle for convenience of two-hand operation of the assembly.

Still another object is to provide means to permit rotation of the driving and driven heads on the stabilizer rod but prevent axial movement of the heads relative thereto whereby proper operation of the rotation-imparting angle rods is had.

With these and other objects in view, our invention consists in the construction, arrangement and combination of the various parts of our angle drive assembly, whereby the objects above contemplated are attained, as hereinafter more fully set forth, pointed out in our claims and illustrated in detail on the accompanying drawing, wherein:

FIG. 1 is a perspective view of an angle drive assembly embodying our invention;

FIG. 2 is an enlarged perspective view of a portion thereof as viewed from a position opposite that shown in FIG. 1;

FIG. 3 is a longitudinal sectional view through the assembly and

FIG. 4 is a detail sectional view on the line 4—4 of FIG. 3.

On the accompanying drawing we have used the reference numerals 10 to indicate a driving head and 12 a driven head. A stabilizer rod is shown generally at 14 and has a shank portion 16 and an angle portion 18. The heads 10 and 12 are rotatable on the shank portion 16 and the angle portion 18 respectively, and means is provided for preventing axial movement of the heads on the rod comprising lock pins 17 shown in detail in FIG. 4 in annular grooves 19 of the rod.

The driven head 12 may be associated with any type of tool or the like such as a bolt and nut engaging socket 24. For this purpose the head 12 may be provided with a socket adapter shank 22 in the usual manner for socket wrenches. The invention, of course, is not limited to socket wrench types of tools but is also suitable for screw driver bits, drills, reamers, countersinks and the like.

With further reference to the construction of our angle drive assembly, a stabilizer handle 26 is rigidly secured to the stabilizer rod shank portion 16 of the stabilizer rod 14 by securing the same to a connecting tube 28 which in turn is secured to the outer end of the shank 16 as by pins 21 and 23 respectively shown in FIG. 3.

For imparting rotation to the driving head 10 and thereby to the driven head 12 through the angle rods 20, a sleeve 30 is provided, the left-hand end of which is inserted in a counterbore of the head 10 and secured therein as by brazing, hard soldering or the like. Preferably the sleeve 30 has a rotation-imparting handle 32 fixed thereto as by a lock pin 34. The handle 32 may be located at any desired position on the sleeve 30 but preferably is adjacent the stabilizer handle 26 for convenience of two-hand operation.

Angle drives of the type having the heads 10 and 12, and the angle rods 20, are old as disclosed in the publication "Ingenious Mechanisms" edited by Franklin D. Jones, Vol. II, Industrial Press, New York City, 1936, Ninth Printing 1951, pp. 349, 350 and 351. A similar angle drive is shown in Redard Patent No. 2,811,025. Where the drive shaft and the driven shaft are journalled in bearings, there is no stabilizing problem with this type of angle drive.

Whenever the angle drive is used in connection with a wrench set or the like, however, it is difficult to keep the tool properly oriented with respect to the work without a stabilizer rod such as shown at 14 in the foregoing specification and provided with a handle such as 26 for substantial grasp of the tool to hold the shank 22 and the socket 24 or whatever tool is mounted thereon properly engaged with the work. Then by providing the rotation-imparting handle 32 adjacent the handle 26, the tool may be conveniently held in one hand while using the other to rotate the socket 24.

The rotation-imparting handle 32 is shown hexagon in shape. A wrench may therefore be associated with it for added leverage to rotate the head 10 and thereby the head 12.

While a right angle type of drive has been disclosed, the angle is immaterial. For instance it may be 120°, 150°, or 170° etc. where an angle drive of the type shown is suitable for specific applications. Usually the angle drive is used because there is not enough operating space in alignment with the bolt or nut axes being tightened or loosened to accommodate an ordinary socket wrench as well as the hand of the operator of the tool. An angle drive is therefore desirable and is inexpensively provided in accordance with the present invention as distinguished from universal joints, bevel gear drives and the like.

Some changes may be made in the construction and arrangement of the parts of our angle drive assembly without departing from the real spirit and purpose of our invention, and it is our intention to cover by our claim any modified forms of structure or use of mechanical equivalents which may reasonably be included within their scope.

We claim as our invention:

1. In an angle drive assembly of the type having a driving head and a driven head operatively connected together by rotation-imparting angle rods slidable in said heads and located around their axes of rotation, a stabilizer rod having a shank portion and an angle portion, a stabilizer handle secured to said shank portion, said driving head being journalled for rotation on said shank portion and said driven head being journalled for rotation on said angle portion, and a rotation-imparting sleeve rotatable on said shank portion between said driving head and said stabilizer handle and secured to said driving head whereby rotation of said rotation-imparting sleeve effects rotation of said driving head and thereby said driven head through said rotation-imparting angle rods.

2. An angle drive assembly according to claim 1 wherein a rotation-imparting handle is secured to said rotation-imparting sleeve.

3. An angle drive assembly according to claim 3 wherein said rotation-imparting handle is located adjacent said stabilizer handle.

4. An angle drive assembly according to claim 1 wherein means is provided for permitting rotation but preventing axial movement of said driving head relative to said shank portion of said stabilizer rod and of said driven head relative to said angle portion thereof.

References Cited

UNITED STATES PATENTS

| | | | |
|---|---|---|---|
| 1,119,514 | 12/1914 | Jonsson | 64—20 |
| 1,166,401 | 12/1915 | Faltin | 64—20 |
| 2,81,025 | 10/1957 | Redard | 64—20 |

FOREIGN PATENTS 1,356,757  2/1964  France.

HALL C. COE, *Primary Examiner.*